(12) United States Patent
Ise et al.

(10) Patent No.: US 6,319,601 B1
(45) Date of Patent: Nov. 20, 2001

(54) POLYVINYL ALCOHOL BASED FIBERS

(75) Inventors: Tomokazu Ise; Tetsuo Nishizaki; Toshihiro Hamada; Kiyohiko Sho, all of Okayama-Pref. (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/617,806

(22) Filed: Jul. 17, 2000

(30) Foreign Application Priority Data

Jul. 16, 1999 (JP) .................................................. 11-202746

(51) Int. Cl.$^7$ ................................ D01F 6/50; D01F 6/00; D02G 3/48
(52) U.S. Cl. ...................... 428/364; 428/394; 428/375; 152/451; 152/531; 152/532; 152/527; 264/185
(58) Field of Search ..................................... 428/375, 364, 428/394; 152/151, 527, 526, 531, 532, 451; 264/185

(56) References Cited

U.S. PATENT DOCUMENTS 4,398,582 * 8/1983 Yuto et al. ..................... 152/209 R
5,968,295 * 10/1999 Kohno et al. ..................... 152/527

FOREIGN PATENT DOCUMENTS

| 6-207338 | 7/1994 | (JP) . |
| 7-189066 | 7/1995 | (JP) . |
| 8-218221 | 8/1996 | (JP) . |
| 09-021016 | 1/1997 | (JP) . |
| 9-21016 | 1/1997 | (JP) . |
| 09-228251 | 9/1997 | (JP) . |
| 9-228251 | 9/1997 | (JP) . |
| 09-291477 | 11/1997 | (JP) . |
| 9-291477 | 11/1997 | (JP) . |

* cited by examiner

Primary Examiner—N. Edwards
(74) Attorney, Agent, or Firm—Oblon, Spivak, McClelland, Maier & Neustadt, P.C.

(57) ABSTRACT

Polyvinyl alcohol based fibers having good fatigue resistance, dipped cords comprising the polyvinyl alcohol based fibers and having good fatigue resistance, and a method for producing the dipped cords. The polyvinyl alcohol based fibers have a tanδ at 90° C. of at least 0.12, substantially one peak of tanδ within a temperature range of from 60 to 120° C., and an elongation at break of at least 12%.

20 Claims, 3 Drawing Sheets

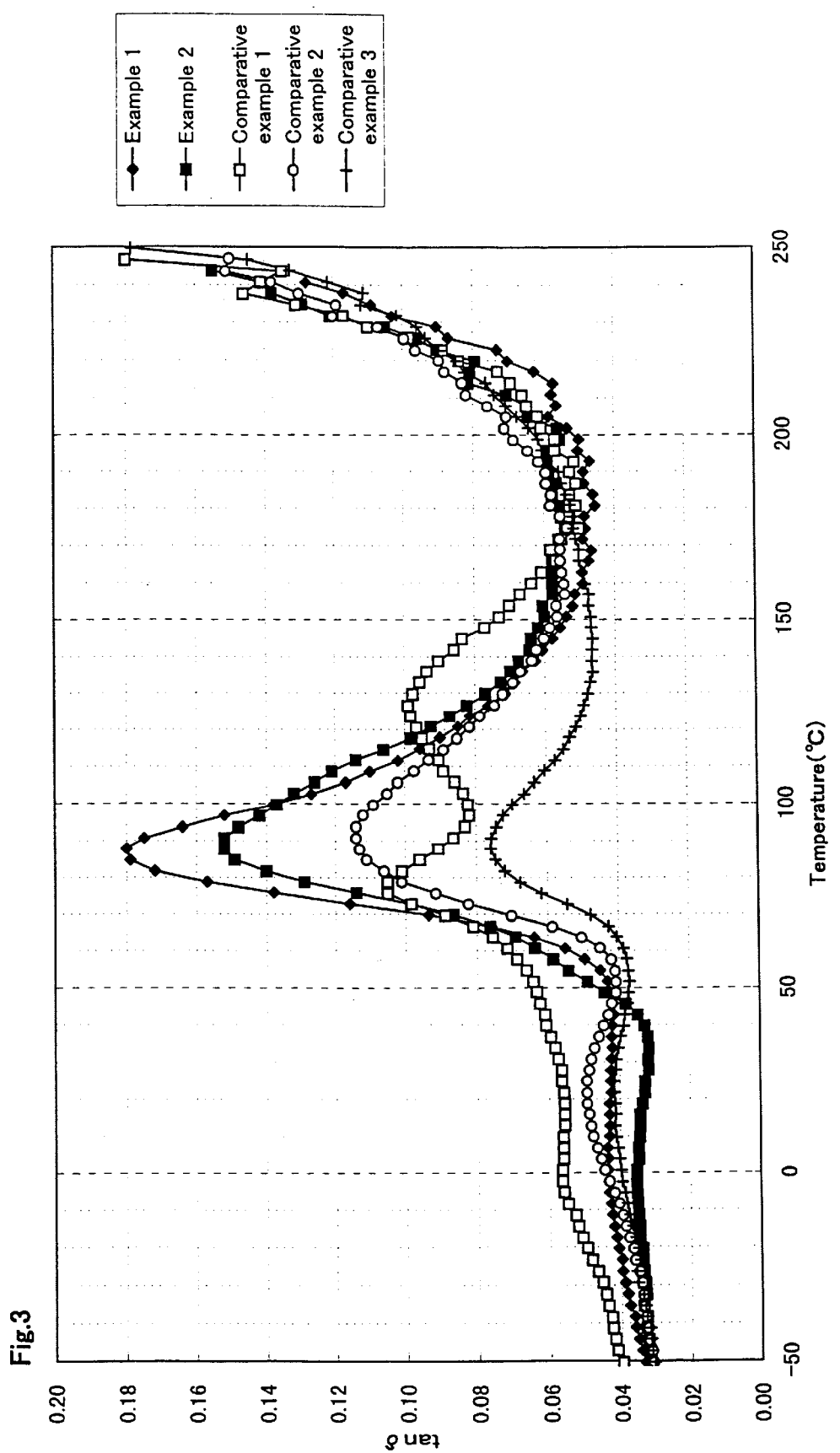

POLYVINYL ALCOHOL BASED FIBERS

BACKGROUND OF THE INVENTION

1. Field of the Invention

The present invention relates to polyvinyl alcohol based fibers of strong resistance to fatigue, and also relates to dipped cords of strong resistance to fatigue that comprise the polyvinyl alcohol based fibers, and to a method for producing the dipped cords. The invention further relates to a rubber-reinforcing material of strong resistance to fatigue that comprises the dipped cords.

2. Discussion of the Background

Fibers have been widely used in reinforcing materials for cement, rubber, resin, etc. For rubber-reinforcing materials, for example, dipped cords are widely used that are prepared by specifically processing fiber bundles for enhancing their adhesiveness to rubber, for example, through RFL (resorcinol-formalin latex) treatment. Such dipped cords are required to have not only good mechanical properties but also other properties such as fatigue resistance, etc. In particular, where dipped cords are used for tire cords, brake hose-reinforcing materials, belt reinforcing materials and others, they are required to have high-level properties of pressure resistance, fatigue resistance, dimensional stability, etc.

For rubber-reinforcing materials, polyvinyl alcohol (PVA) based fibers, rayon fibers, polyester fibers, nylon fibers, aramide fibers, etc., have heretofore been generally used. However, these fibers have some problems. The strength of rayon fibers is low. Using large quantities of such weak rayon fibers is inevitable for ensuring elevated reinforcement, which, however, causes production cost increase and up-sizing of products. Nylon fibers are greatly deformed by external stress applied thereto, as having a low modulus of elasticity. Polyester fibers are strong and have a high modulus of elasticity in some degree, but their adhesiveness to rubber is poor. In addition, since they often shrink after being vulcanized, the dimension of products containing them will vary. Aramide fibers are strong and have a high modulus of elasticity, but their adhesiveness to rubber and their fatigue resistance are poor. On the other hand, PVA based fibers are strong and have a high modulus of elasticity, and their adhesiveness to rubber is good. In addition, their dimension changes little after vulcanization. For these reasons, PVA based fibers are widely used for rubber-reinforcing materials for hoses, belts, etc.

Increasing the seat area in automobiles is desired for comfortable drives. Contrary to this, however, the recent tendency is toward down-sized automobiles, for which the engine room and the tire wheel space is reduced. In many cases to meet this requirement, a brake hose is fitted to a narrower space than previously, at an extremely small bend angle having a radius of curvature of at most 30 mm, often preferably at most 20 mm, and is repeatedly expanded and compressed under severe conditions. In addition, to reduce the maintenance cost and treatment of automobiles, brake hoses are desired to have more high-level fatigue resistance. Similarly, reinforcing materials for tire cords, belts and others are also desired to have more high-level fatigue resistance.

In addressing the situation above, dipped cords have been proposed having increased strength and elasticity and having enhanced fatigue resistance, for example, in Japanese Patent Laid-Open No. 207338/1994, in which fibers of PVA having a high degree of polymerization are used. The PVA based fibers have an increased strength and an increased modulus of elasticity. To form them into dipped cords, cords of the PVA based fibers are dipped in an RFL liquid with their tension being lowered so that RFL can penetrate deep into the cords, and, after having been thus dipped, the cords are subjected to thermal fixation with their tension being increased so as to reduce twist irregularity. In this method, however, high-strength high-elasticity fibers of PVA of which the polymer chains are oriented to a high degree are used. Therefore, even though the dipping condition for the PVA based cords is specifically controlled in the manner as above, the fatigue resistance of the dipped cords cannot still be enhanced to a satisfactory degree. Their fatigue resistance is still low under the severe conditions described above.

On the other hand, Japanese Patent Laid-Open No. 189066/1995 discloses dipped cords of enhanced resistance to fatigue, for which high-elongation PVA based fibers are used. The PVA based fibers are prepared by suitably controlling the draw ratio and therefore have a high degree of elongation at break that falls between 6 and 12%. Japanese Patent Laid-Open No. 218221/1996 discloses using PVA based fibers for rubber reinforcing materials, etc. To enhance their fatigue resistance, abrasion resistance and dimensional stability, the PVA based fibers are treated for thermal shrinkage of from 1 to 15%, preferably from 2 to 10%, thereby making the orientation in their amorphous segments disordered. However, it is still difficult to satisfactorily enhance the fatigue resistance of dipped cords and fibers by merely increasing the degree of their elongation at break.

SUMMARY OF THE INVENTION

In consideration of the problems noted above, the object of the present invention is to provide PVA based fibers and dipped cords having excellent properties such as good fatigue resistance, and also to provide a method for producing dipped cords having good fatigue resistance, and rubber-reinforcing materials that comprise the dipped cords.

The invention is based on the finding that specific PVA based fibers, having tan$\delta$ at 90° C. of at least 0.12, having substantially one peak of tan$\delta$ within a temperature range of 60 to 120° C., and having a degree of elongation at break of at least 12%, have good fatigue resistance. Such PVA based fibers ensure a high degree of fatigue resistance even under severe conditions, for example, in reinforcing materials for hoses (e.g., brake hoses, power steering hoses, etc.), tire cords, belts, etc.

BRIEF DESCRIPTION OF THE DRAWINGS

FIG. 3 is a graph indicating the relationship between the value of tan$\delta$ and the temperature of the dipped cords prepared in the Examples and Comparative Examples.

DESCRIPTION OF THE PREFERRED EMBODIMENTS

In the invention, it is important that the PVA based fibers have tan$\delta$ at 90° C. of at least 0.12, but preferably at least 0.13, more preferably at least 0.14. The terminology tan$\delta$ (loss tangent) referred to herein is a parameter of the dynamic viscoelasticity of a sample, indicating the response of the sample being vibrated at a predetermined frequency and at a predetermined amplitude. It indicates the tangent of the phase shifts of the output wave from the sample relative to the input wave thereto. For its numerical equation, $\tan\delta=E''/E'$ where E' represents the storage elastic modulus of the sample and E'' represents the loss elastic modulus thereof. In polymer fibers having a high value of $\tan\delta$ at 90° C., the amorphous segments of the polymer have a high degree of mobility and a high degree of freedom. Accordingly, when having received external stress, the polymer fibers could well absorb and relay it, and their fatigue resistance is therefore high.

For example, brake hoses in automobiles are heated up to around 70° C. in ordinary environments where they are driven, but will be heated up to around 90° C. in severe conditions where they are continuously driven along long sloping-down roads. Accordingly, the accelerated durability test for brake hoses is carried out exclusively at temperatures abound 90° C. The PVA based fibers of the invention have a high value of tangent 90° C., therefore ensuring good fatigue resistance even under extremely severe conditions such as those described above. The uppermost limit of $\tan\delta$ at 90° C. of the PVA based fibers is not specifically limited, but may be generally up to 0.30, preferably up to 0.25.

It is also important that the PVA based fibers of the invention have substantially one peak of $\tan\delta$ within a temperature range of 90±30° C. (preferably 90±20° C.), i.e., at a temperature falling between 60 and 120° C. (preferably between 70 and 110° C.). Though not clear, it is believed that the reason is that in the polymer fibers having such a peak, the amorphous segments of the polymer are not restrained and their freedom is therefore high. It is believed that the ability of the fibers to relax and absorb external stress is high and their fatigue resistance is therefore high.

Figure 1:
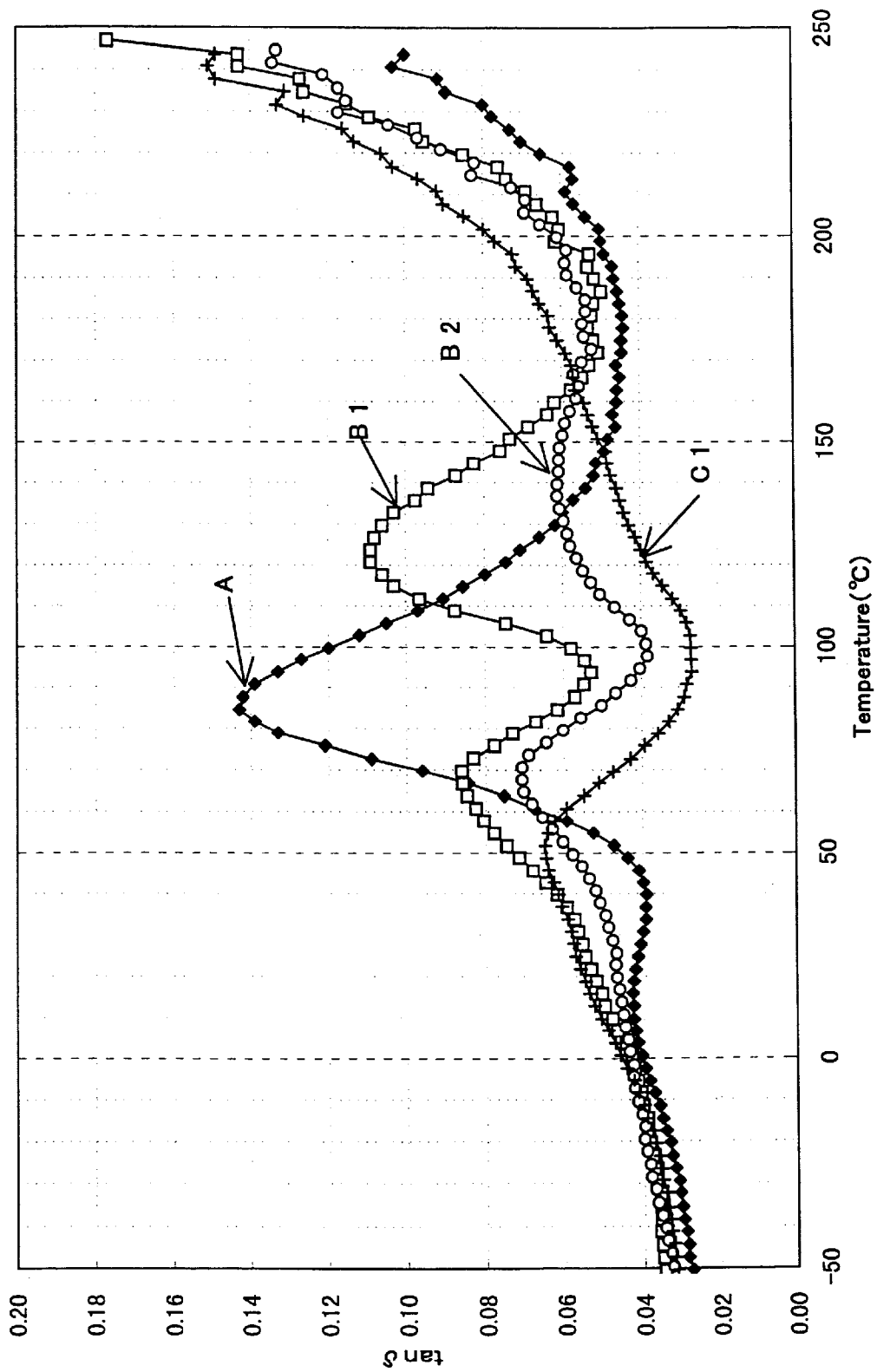
FIG. 1 is a graph schematically indicating the relationship between the value of tan$\delta$ and the temperature of PVA based fibers of the invention (Curve A), ordinary dry-spun PVA based fibers (Curve B1 and Curve B2) and ordinary wet-spun PVA based fibers (Curve C).

Conventional PVA based fibers have a low value of $\tan\delta$ at 90° C., and, in general, they do not have one peak of $\tan\delta$ at 60 to 120° C. Their $\tan\delta$ profile is as follows: Of dry-spun PVA based fibers, $\tan\delta$ increases with the increase in the ambient temperature, and they have a first peak of $\tan\delta$ at around 70° C. At temperatures higher than 70° C., $\tan\delta$ rapidly lowers; and at around 90° C., it lowers to about 0.06 or so. With further increase in temperature, $\tan\delta$ again increases, showing a second peak at 120 to 130° C. With still further increase in temperature, it again lowers to give that second peak (see the curve B1 and B2 in FIG. 1). The $\tan\delta$ profile is based on the primary structure and the secondary structure of PVA constituting the fibers, giving the two peaks at 60 to 80° C. and at 110 to 130° C. The secondary structure of ordinary PVA based fibers is restrained by hydrogen bonds, and $\tan\delta$ of the fibers is low as a whole.

On the other hand, of wet-spun PVA based fibers, the amorphous segments of PVA have an extremely low degree of freedom for the reasons described below, and $\tan\delta$ of the fibers is therefore low as a whole. In particular, since the secondary structure of PVA has a low degree of freedom, the wet-spun PVA based fibers do not have a definite second peak of $\tan\delta$, being different from the dry-spun PVA based fibers mentioned above. Accordingly, they do not have a large convex peak of $\tan\delta$ at 60 to 120° C. (see the curve C in FIG. 1). In these fibers, the amorphous segments have a lower degree of freedom than those in the fibers of the invention. When having received external stress (especially at around 90° C.), the conventional fibers cannot well absorb and relax the stress, and their fatigue resistance is therefore poor.

Contrary to the above-described fibers, the structure of the amorphous segments in the fibers of the invention is suitably disordered, and the total structure of the fibers could be well homogenized. As a result, it is believed that the fibers of the invention have substantially one peak of $\tan\delta$, and in addition, the degree of freedom in their amorphous segments is increased to thereby give such a large peak of $\tan\delta$ (see the curve A in FIG. 1).

The value of $\tan\delta$ at 90° C. referred to herein is measured according to the method described in Examples to follow hereinunder. The fibers of the invention have a convex peak of $\tan\delta$ at 60 to 120° C. (preferably at 70 to 110° C.).

However, PVA based fibers having such a specific $\tan\delta$ profile could not all the time have high-level fatigue resistance, and it is indispensable to specifically define the elongation at break of PVA based fibers in order that the fibers have high-level fatigue resistance. The elongation at break of the PVA based fibers must be at least 12%. Preferably, it is at least 13%, more preferably at least 14%, even more preferably at least 15%, still more preferably at least 16%. With the elongation at break being defined to fall within the range, the PVA based fibers can have significantly increased fatigue resistance.

Though not clear, the reason why the fatigue resistance of the PVA based fibers can be significantly increased by both specifically defining their $\tan\delta$ profile and increasing their elongation at break is believed to be because, in the PVA based fibers of an increased elongation at break, the PVA chains can have some surplus to the fiber length, and therefore the fibers can be resistant to larger forces of compression and expansion. Where the PVA chains do not have any surplus, the PVA chains are in substantially expanded condition. In that case, therefore, even though the PVA fibers have a large value of $\tan\delta$ and their amorphous segments have a large degree of freedom, they could not fully relax external stress applied thereto when they are greatly compressed. However, where the PVA chains are not completely expanded but still have some surplus, the surplus of the PVA chain to the fiber can be deformed and the PVA based fibers can relax external stress applied thereto. In that case, in addition, even when the fibers are expanded, the surplus of the PVA chains constituting them can be further expanded, and, as a result, it is believed that the PVA based fibers can relax external stress applied thereto and their fatigue resistance will be thereby enhanced. The elongation at break of the fibers is not specifically limited, but may be generally up to about 30%.

It is desirable that the tensile tenacity of the PVA based fibers of the invention be at least 5 cN/dtex, more preferably at least 6 cN/dtex, in view of the reinforcing ability of the fibers. The uppermost limit of the tensile tenacity of the fibers is not specifically limited. However, where their tensile tenacity is too high, the fibers cannot have a satisfactory degree of elongation at break. Therefore, it is desirable that the tensile tenacity of the fibers be at most 20 cN/dtex, more preferably at most 10 cN/dtex. As a rule, PVA based fibers having been drawn at a high draw ratio to thereby have an increased degree of oriented crystallization are so characterized that their tensile tenacity is elevated but their elongation at break is lowered. On the contrary, PVA based fibers having an elevated degree of elongation at break have a lowered degree of tensile tenacity. Therefore, the PVA based fibers of the invention will often have lowered degree of tensile tenacity, while having an elevated degree of elongation at break. However, the PVA based fibers having such a greatly increased degree of elongation at break can enjoy significantly increased fatigue resistance. Therefore, even though their tensile tenacity is lowered to some degree, the fibers are good as a whole. As so demonstrated in the Examples described hereinunder, the PVA based fibers of the invention ensure fatigue resistance of at least 80%, especially from 85 to 100%, under severe conditions under which they were actually tested.

The method for producing the PVA based fibers of the invention is not specifically limited. However, production of the PVA based fibers will be difficult using ordinary methods. Accordingly, it is desirable to produce the PVA based fibers of the invention, for example, according to the method described below.

For producing PVA for use in the invention, it is desirable to partially or completely saponify the precursor, polyvinyl acetate. PVA for use herein may be copolymers that comprise two or more monomers including vinyl alcohol, or may also be others having been modified with any other components.

Preferably, the saponification degree of PVA for use herein is at least 70 mol %, more preferably at least 90 mol %, in view of its ability to solidify while it is spun. Even more preferably, the saponification degree of the polymer falls between 99 and 100 mol % in view of the heat resistance, the spinnability and the mechanical properties of the polymer. Fibers of PVA having an increased saponification degree are hardly agglutinated together, and non-agglutinated PVA based fibers can have good fatigue resistance. In particular, the PVA based fibers having an increased saponification degree are prevented from being agglutinated together in a process where they are dipped in a rubber adhesiveness improver (e.g., RFL, etc.) and then thermally fixed. The saponification degree referred to herein indicates the ratio of the hydrolyzed vinyl alcohol units in PVA to the total vinyl acetate units in the precursor, polyvinyl acetate or its copolymer. Preferably, the mean degree of polymerization of PVA for use herein falls between about 1000 and 5000, more preferably at most 4000 and even more preferably at least 1500, in view of the spinnability, the drawability, the elongation at break, the mechanical properties and the cost of the PVA based fibers.

The PVA based fibers of the invention may be composed of only such PVA, or they may contain additives and any other polymers, For example, they may be blend spun fibers (e.g., sea-island structured fibers, etc.) or multi-component spun fibers of PVA with any other polymers. However, in view of their mechanical properties and heat resistance, preferred are PVA based fibers of which at least 50% by mass, more preferably from 80 to 100% by mass, is PVA. (The term "by mass" as used herein also means "by weight".)

Spinning dope that comprises PVA as above is prepared.

The solvent for the spinning dope may be either aqueous solvents or organic solvents, However, in view of the productivity and the production cost, and for obtaining PVA based fibers having a large degree of tan$\delta$ at 90° C., it is desirable that the spinning dope be an aqueous solution of PVA. Preferably, the PVA concentration of the spinning dope falls between 10 and 60% by mass, more preferably between 40 and 55% by mass. Spinning dope having a too high PVA concentration is favorable, since the polymer chains constituting the resulting PVA based fibers will be difficult to expand and will be configured at random. Accordingly, the PVA based fibers can have an increased degree of tan$\delta$ at 90° C. and can have enhanced fatigue resistance. Naturally, dipped cords of such PVA based fibers can have enhanced fatigue resistance. Any other additives may be added to the spinning dope.

Next, the spinning dope is spun. For obtaining PVA based fibers having a large degree of tan$\delta$ at 90° C. from the spinning dope, a dry spinning process is preferred since a wet spinning process or a dry-wet spinning process requires a step of solidifying the spun spinning dope from a nozzle in a solidifying bath, for which, therefore, the PVA concentration of the spinning dope must be relatively low. The PVA polymer chains in the spinning dope having such a relatively low PVA concentration will be often expanded. In addition, in the wet or dry-wet process, since the spun spinning dope from a nozzle is directly solidified, the PVA chains constituting the resulting PVA based fibers will be oriented relatively regularly. If so, the PVA based fibers will have a small degree of tan$\delta$ at 90° C. On the other hand, in a dry spinning process, the PVA concentration of the spinning dope can be relatively high and the PVA chains are configured at random and are not expanded. In addition, in the process, the spun spinning dope from a nozzle is gradually dried. Accordingly, the PVA chains constituting the resulting PVA based fibers can be configured at random and can have surplus, and the PVA based fibers can have a large tan$\delta$ at 90° C. For these reasons, such a dry spinning process in which spinning dope is spun out into a vapor atmosphere (preferably into air) and the resulting fibers are directly dried therein, is preferred for producing the PVA based fibers of the invention.

The drying temperature at which the spun spinning dope from a nozzle is dried is not specifically limited, generally falling between 100 and 250° C., but preferably between about 120 and 250° C. Next, the dried fibers are drawn under dry heat for improving their mechanical properties and swelling resistance. Preferably, the total draw ratio in dry heat treatment is at least 9 times, more preferably at least 10 times, even more preferably at least 11 times the original length of the fibers. A higher draw ratio in dry heat treatment increases the tensile tenacity of the drawn fibers and reduces the intermediate elongation thereof under a load of 1.8 cN/dtex that will be described below. However, with the increase in the draw ratio, the value of tan$\delta$ at 90° C. and the elongation at break of the fibers decrease. Accordingly, it is desirable that the degree of orientation of the fibers is not so much increased over the desired level. The total draw ratio of the fibers is preferably at most 30 times, more preferably at most 20 times, even more preferably at most 15 times, still more preferably at most 13 times the original length of the fibers. The temperature for the dry heat treatment preferably falls between about 180 and 250° C., more preferably between 200 and 250° C.

Next, the fibers are subjected to thermal shrinkage treatment in order to obtain the desired value of tan$\delta$ at 90° C. and the desired elongation at break. Preferably, the fibers are subjected to thermal shrinkage treatment to a degree of shrinkage of at least 13%, more preferably at least 14%, even more preferably from 15 to 30%. As so described above, the PVA based fibers must have an increased value of tan$\delta$ at 90° C. and an increased degree of elongation at break in order that the fibers and the dipped cords comprising them can have an increased level of fatigue resistance. Therefore, through the thermal shrinkage treatment, it is desirable to increase the value of tan$\delta$ at 90° C. and the elongation at break of the PVA based fibers. Preferably, the condition for the thermal shrinkage treatment including the degree of shrinkage and the heating temperature is defined, depending on the fineness of the fibers and the polymer constituting them. If desired, the fibers may be further subjected to any other treatment such as thermal fixation, etc. The PVA chains in dry-spun PVA based fibers are not so much expanded and therefore have surplus, as compared with those in wet-spun PVA based fibers. Therefore, as for the dry-spun PVA based fibers, their tan$\delta$ at 90° C. and elongation at break can be more effectively increased by such thermal shrinkage treatment. Preferably, the temperature for the thermal shrinkage treatment falls between 200 and 250° C., more preferably between 230 and 250° C. It is desirable that the temperature for the thermal shrinkage treatment be on the same level as that of the temperature for the previous dry heat drawing treatment.

The process of producing the PVA based fibers of the invention requires a specific condition under which the fibers produced can have an increased value of tan$\delta$ at 90° C. and have one pak of tan$\delta$ within a predetermined temperature range. As so described above, ordinary dry-spun PVA based fibers generally have a small value of tan$\delta$ and have two peaks of tan$\delta$. Therefore, in the process of producing the PVA based fibers of the invention, a specific treatment for varying tan$\delta$ of the fibers produced is inevitable. It is expected that PVA based fibers having an increased degree of elongation at break can have enhanced fatigue resistance to some degree. However, in PVA based fibers having a small degree of tan$\delta$, the amorphous segments are restrained and the degree of freedom therein is small. Therefore, the PVA based fibers of that type can hardly relax external stress to a satisfactory degree.

The means for increasing tan$\delta$ at 90° C. of PVA based fibers and for making the fibers have one peak of tan$\delta$ is not specifically limited, for which, however, preferred is a method of adding a cyclic polyalcohol or its derivative to the PVA based fibers. (The term "cyclic polyalcohol derivative" as used herein is intended to include the cyclic polyalcohol per se.) Though not clear, the reason why the cyclic polyalcohol derivative added to PVA based fibers can attain the intended object is believed to be because the derivative will bond to PVA constituting the fibers or will penetrate into the PVA structure to disturb the structure of the PVA chains, whereby the PVA structure will be disordered suitably and homogeneously to change tan$\delta$ of the PVA based fibers. In particular, where a cyclic polyalcohol derivative is added to high-elongation PVA based fibers in which the orientation crystallization is not so much promoted, the derivative can relatively easily penetrate into the fibers, and the resulting fibers are easy to process. In addition, the degree of freedom in the amorphous segments of the PVA based fibers, in which the degree of freedom is originally high, is much more elevated, and therefore the PVA based fibers to which the derivative is added can have a further increased value of tan$\delta$ at high temperatures. Even when a cyclic polyalcohol derivative is added to low-elongation PVA based fibers in which the orientation crystallization has been promoted to a high degree, the derivative can hardly penetrate into the fibers and will therefore take a lot of time to penetrate thereinto, and the value of tan$\delta$ of the processed PVA based fibers can increase only a little.

The cyclic polyalcohol derivative to be used in the invention includes cyclic compounds having at least two hydroxyl groups and their derivatives. More specifically, it includes aromatic compounds having at least two hydroxyl groups, for example, benzenediols, naphthalenediols and the like, such as catechol, resorcinol, etc.; and their derivatives. The derivatives include salts, esters, ethers and acetals of such cyclic polyalcohols, and they are of decreased vaporization of sublimation. In the invention, usable are a plurality of cyclic polyalcohol derivatives as combined.

In the invention, especially preferred are polyphenols having at least two hydroxyl groups on one benzene ring, and their derivatives. Of these, more preferred are biphenols and their derivatives, especially those in which two hydroxyl groups are ortho-positioned, in view of their favorable influences on tan$\delta$ the PVA based fibers containing any of them. and its derivatives are preferred for use herein. More preferred are salts of catechol (especially, sodium salts thereof), in view of their ability to prevent their vaporization from PVA based fibers, their favorable influences on tan$\delta$ of PVA based fibers, their costs and their handleability.

In view of the fatigue resistance of the PVA based fibers containing it, the cyclic polyalcohol derivative preferably comprises at least 50% by mass, more preferably at least 80% by mass of catechol and/or its derivatives.

With the increase in the cyclic polyalcohol derivative content of the PVA based fibers of the invention, tan$\delta$ at 90° C. of the PVA based fibers increases. Therefore, it is desirable that the PVA based fibers contain at least 0.1% by mass, more preferably at least 1% by mass of the cyclic polyalcohol derivative, based on the mass of the fibers. From the viewpoint of the fibrous properties and the adhesiveness to rubber of the PVA based fibers, however, the amount of the cyclic polyalcohol derivative to be in the fibers is preferably at most 30% by mass, more preferably at most 20% by mass based on the mass of the fibers. Even though a larger amount of the cyclic polyalcohol derivative is added to the fibers, the fatigue resistance of the fibers cannot be so much enhanced. Therefore, in view of the cost, the amount of the cyclic polyalcohol derivative to be in the fibers is preferably at most 10% by mass, more preferably at most 5% by mass.

In Japanese Patent Laid-Open Nos. 21016/1997, 228251/1997 and 291477/1997, it is stated that polyalcohols can trap boric acid compounds in brake fluid. However, these references state only that polyalcohol can trap boric acid compounds, but disclose nothing about tan$\delta$ and elongation of PVA based fibers containing polyalcohols. For example, in Examples of the laid-open specifications, PVA based fibers of Kuraray's 1239 are used. The PVA based fibers used therein have a high degree of orientation crystallization and therefore have a degree of elongation at break of around 8%. Accordingly, it will take a lot of time to treat the PVA based fibers with a polyalcohol derivative, and, in addition, the PVA based fibers treated therewith can have a degree of tan$\delta$ of at most about 0.11. Moreover, since their elongation at break is low, the PVA based fibers cannot enjoy high-level fatigue resistance, unlike those of the invention. This is obvious from the data in Comparative Example 2 to follow below.

In the invention, the method of applying a cyclic polyalcohol derivative to PVA based fibers is not specifically limited. The derivative may be applied to PVA based fibers while the fibers are produced (for example, by adding it to the spinning dope, or by adding it to the just spun fibers, or by adding it to the spun fibers before they are wound up), or may be applied thereto after the fibers have been produced. In view of the productivity, preferred is the latter method of adding the derivative to PVA based fibers after they have been produced. In the invention, high-elongation-PVA based fibers in which the degree of orientation crystallization is not so much promoted are used. Therefore, even in the method of adding a cyclic polyalcohol derivative to the PVA based fibers after the fibers have been produced, the derivative can easily penetrate into the fibers and the fibers can be efficiently processed with the derivative. The cyclic polyalcohol derivative may be directly applied to the PVA based fibers, but may be applied thereto after having been dissolved in a suitable solvent.

For forming the PVA based fibers of the invention into dipped cords, any of a method of dipping twisted fibers in a solution of a cyclic polyalcohol derivative followed by drying them may be employed; or a method of adding a cyclic polyalcohol derivative to a rubber adhesiveness improver (e.g., RFL liquid, epoxy processing liquid, rubber paste liquid, etc.) so that the fibers can be processed with the derivative along with the rubber adhesiveness improver. Apart from these methods, a method of knitting the reinforcing fibers into hoses followed by adding the derivative thereto is also employable; or a method of adding the derivative to the surface or the inside of the inner tubular rubber or the outer skin rubber. If desired, any of such a plurality of methods may be combined in any desired manner. However, for simplifying the process steps and for ensuring good penetration of the cyclic polyalcohol derivative into fibers, it is desirable to add the derivative to the rubber adhesiveness improver (e.g., RFL liquid, epoxy processing liquid, rubber paste liquid, etc.). Adding the rubber adhesiveness improver to the fiber much enhances the adhesiveness of the resulting PVA based fibers to rubber. Therefore, the method is favorable as producing better results. Where the cyclic polyalcohol derivative to be used is highly volatile and will evaporate in the step of drying the processed PVA based fibers, it is desirable to apply an increased amount of the derivative to fibers. The cyclic polyalcohol derivative added to the PVA based fibers and their dipped cords increases tan$\delta$ of the fibers and the cords, and, in addition, it is effective for trapping boric acid compounds in brake fluid.

The PVA based fibers thus obtained in the manner described above may be directly used for reinforcing materials. For rubber reinforcing materials, however, they are preferably processed with a rubber adhesiveness improver to be dipped cords.

The fineness of the PVA based fibers that constitute such dipped cords may be suitably defined. In view of their reinforcing capability, fatigue resistance and productivity, the single fiber fineness of the PVA based fibers preferably falls between 1 and 20 dtex or so. In view of the productivity and the mechanical properties of the dipped cords, bundles of the PVA based fibers (preferably, twisted bundles of multi-filament yarns of the fibers) are processed and formed into dipped cords. The number of fibers constituting each bundle is preferably at least 5, more preferably at least 10. Employed is a method of twisting multi-filament yarns of from about 900 to 4000 dtex, but preferably from about 1000 to 2500 dtex, at a count of twist of from 20 to 120 t/m. In general, plied yarns have a higher degree of fatigue resistance than single-twisted yarns and yarns twisted at a larger count of twist have a higher degree of fatigue resistance. However, they are often unfavorable, since their production steps are complicated and since they are bulky. In the invention, even when a rubber adhesiveness improver is applied to single-twisted yarns of the PVA based fibers, especially to those twisted at a small count of twist (100 t/m or smaller, and even at 60 t/m or smaller), the resulting dipped cords can have good fatigue resistance.

For the fibers constituting the dipped cords, PVA based fibers are indispensable, as having good mechanical strength and good expansion resistance. However, it is not always necessary that the fibers constituting the dipped cords be all PVA based fibers, but they may be combined with any other fibers, non-PVA based fibers. In order to ensure the effect of the invention, it is desirable that at least 60% by mass, more preferably at least 80% by mass, even more preferably from 95 to 100% by mass of the fibers constituting the dipped cords are PVA based fibers.

The PVA based fiber bundles are processed with a rubber adhesiveness improver.

The rubber adhesiveness improver is not specifically limited, so far as it has the ability to improve the adhesiveness of PVA based fibers to rubber. For example, it includes RFL (resorcinol formalin latex) liquids, epoxy processing liquids, rubber paste liquids, aqueous solutions of polyurethane resins, etc. Of these, preferred is RFL in view of its ability to improve adhesiveness to rubber and of its handleability. More preferred is an aqueous dispersion of RFL, as being uniformly applicable to fibers.

One preferred method of preparing such an RFL liquid comprises mixing a liquid A having been prepared by aging an aqueous solution of resorcinol, formaldehyde and sodium hydroxide at 10 to 40° C. for about 1 to 10 hours, with a liquid B of an aqueous dispersion of latex (having a solid content of from about 40 to 60% by mass), in a ratio falling between 5/95 and 30/70 (by mass), followed by further aging the resulting mixture at 10 to 40° (for about 10 to 30 hours). The composition of the RFL liquid is not specifically limited, but is preferably such that the ratio of latex/resorcinol falls between about 100/1 and 100/20, the ratio of latex/formaldehyde falls between about 100/1 and 100/20, and the ratio of latex/sodium hydroxide falls between about 100/0.1 and 100/3, the ratio being all by mass. The type of the latex to be used can be suitably selected, depending on the type of rubber to be integrated with it. For example, any of styrene-butadiene latex (SBR), vinylpyridine-modified SBR latex, etc., is employable. The amount of RFL (in terms of its solid content) to be adhered to the PVA based fibers is preferably at most 20% by mass/PVA, more preferably from 1 to 10% by mass/PVA, in view of the adhesiveness of the fibers to rubber, and of the handleability, the flexibility and the cost of the processed fibers. The method of applying the rubber adhesiveness improver to the fibers is not specifically limited. For example, any of dipping methods, coating methods, spraying methods, etc., is employable.

After having been processed with such a rubber adhesiveness improver, it is desirable that the fibers be dried and thermally treated so that the improver is fixed thereon. Preferably, the drying temperature may fall between 100 and 130° C.

For elevating tan$\delta$ of the dipped cords, for enhancing the expanding resistance thereof with reducing the elongation thereof under a load of 1.8 cN/dtex, and for increasing the tensile tenacity thereof to thereby enhance the reinforcing ability thereof, it is desirable that the dipped cords be, after having been dried, thermally treated at a temperature falling between 100 and 200° C. (preferably, between 150 and 190° C.) under a tension of at least 0.10 cN/dtex, preferably at least 0.13 cN/dtex. In general, thermal treatment under tension improves the mechanical properties of the treated fibers, but often lowers the elongation at break thereof and degrades the fatigue resistance thereof. However, by so controlling the temperature for heat treatment so that it is lower than the temperature at which the non-processed fibers have been drawn and than the temperature at which they have been thermally shrunk, the elongation at break of the processed fibers can be significantly prevented from being lowered, and dipped cords having good flexibility and good fatigue resistance can be obtained. In view of the productivity, it is desirable that the tension for the heat treatment be at most 1 cN/dtex, more preferably at most 0.5 cN/dtex.

In the invention, the dipped cords must have tan$\delta$ at 90° of at least 0.12, but preferably at least 0.13, more preferably at least 0.14. The uppermost limit of their tan$\delta$ at 90° C. is not specifically limited, but is preferably at most 0.30, more preferably at most 0.25 in order that the dipped cords can have good mechanical properties. The dipped cords can be obtained, for example, from PVA based fibers having a high degree of tanδ at 90° C. Where the PVA based fibers are thermally treated under high tension in the manner as above, their tanδ at 90° C. can be much more increased. Though not clear, the reason why the thermal treatment greatly increases tanδ at 90° C. of the processed cords is believed to be because the fixed PVA based fibers constituting the cords can be heated such that they are not crystallized, whereby the PVA chains having been entangled the PVA chain having surplus undone. As a result, the degree of freedom in the amorphous segments of the PVA chains will be much more elevated, and tanδ of the thus processed cords will increase.

For further enhancing their fatigue resistance, it is desirable that the dipped cords have a peak of tanδ at 60 to 120° C., more preferably at 70 to 110° C., within a temperature range falling between 0 and 200° C., and that the peak is substantially one. The reason is the same as that for the PVA based fibers mentioned above. The uppermost limit of tanδ at 90° C. of the dipped cords is not specifically limited, but may be generally at most 0.30, preferably at most 0.25, for ensuring the mechanical properties of the dipped cords.

In view of their fatigue resistance, the dipped cords preferably have a degree of elongation at break of at least 10%, more preferably at least 11%, even more preferably at least 12%, still more preferably at least 13%. Having such a specific elongation at break, the PVA segments constituting the dipped cords can have some surplus, and the fatigue resistance of the dipped cords can be noticeably enhanced. Such dipped cords can have a degree of fatigue resistance of at least 80%, preferably from 85 to 100%, even under severe conditions such as those under which the samples of the Examples below were actually tested.

From the viewpoint of their fatigue resistance, the dipped cords preferably have a higher degree of elongation at break. However, in view of their productivity and dimensional stability (expanding resistance), it is desirable that the elongation at break of the dipped cords be at most 20%, more preferably at most 17%. Their elongation at break lowers after the dipped cords are thermally treated under tension. Therefore, for producing the dipped cords from PVA based fibers, high-elongation PVA based fibers of which the elongation at break is higher than that desired for the dipped cords are preferably used. It is desirable that the reduction in the elongation at break of the dipped cords through thermal treatment under tension be not larger than 5%, more preferably from 0 to 4%.

In view of their reinforcing ability and dimensional stability (swelling resistance), the dipped cords preferably have a tensile tenacity of at least 5 cN/dtex, more preferably at least 6 cN/dtex. The uppermost limit of the tensile tenacity of the dipped cords is not specifically limited, but is preferably up to 20 cN/dtex in view of the productivity and the cost of the cords. In view of the balance with their elongation at break, however, it is more desirable that the tensile tenacity of the dipped cords be at most 10 cN/dtex. The tensile tenacity of the dipped cords can be increased by increasing the tensile tenacity of the PVA based fibers that are used for producing the cords.

Through the thermal treatment under tension as above, the tensile tenacity of the dipped cords can be increased by at least 0.2 cN/dtex, preferably by about 0.5 to 2 cN/dtex, as compared with that of the non-processed fibers. Since the tensile tenacity of dipped cords can be increased through the thermal treatment under tension, even low-strength fibers having a relatively low degree of tensile tenacity can be formed into dipped cords having a desired degree of tensile tenacity. Where the tension and the temperature for the thermal treatment are increased or elevated, the tensile tenacity of the dipped cords can be further increased.

In view of their dimensional stability and expanding resistance, it is desirable that the dipped cords have a degree of intermediate elongation of at most 4%, more preferably at most 3%, even more preferably at most 2.5%, still more preferably at most 2%, under a load of 1.8 cN/dtex. For example, where the dipped cords are used for reinforcing materials for brake hoses, the brake hoses will be readily expanded by the flow pressure of brake fluid, if the intermediate elongation under a load of 1.8 cN/dtex of the reinforcing materials of the dipped cords used is too large. If so, the pressure loss will be large when a brake pedal is treaded on, and, as a result, a car being driven cannot be braked well. However, in order that the dipped cords can enjoy increased fatigue resistance, it is desirable that the intermediate elongation of the dipped cords under a load of 1.8 cN/dtex be at least 90. Since the intermediate elongation of the dipped cords decreases through the thermal treatment under tension as above, PVA based fibers of which the intermediate elongation is larger than the intended intermediate elongation of the dipped cords can be used for producing the dipped cords. For example, usable are PVA based fibers of which the intermediate elongation falls between about 1 and 6%. The intermediate elongation of PVA based fibers can be reduced by increasing the draw ratio at which the fibers are drawn under dry heat or by reducing the degree of shrinkage to which they are shrunk.

The PVA based fibers of the invention can be used in any form. For example, they can be processed into cut fibers, filament yarns, bundle yarns, spun yarns, fabrics (woven or knitted fabrics, nonwoven fabrics), cords, etc. They can be combined with any other fibers. For their applications, the PVA based fibers can be widely used for reinforcing materials and coating materials for rubbers, resins, hydraulic materials, etc., as having good fatigue resistance.

The dipped cords of the invention can be used in any form. For example, they can be used as cords in many applications, and also for braids, woven or knitted fabrics, etc. They can be combined with or laminated with any other materials. For their applications, the dipped cords are favorable for tire cords, and also for rubber-reinforcing materials such as those for belts (conveyor belts, timing belts, V belts), and those for hoses (hydraulic brake hoses, radiator hoses, firehoses), as having good mechanical strength, fatigue resistance and other various properties. In particular, as having high-level fatigue resistance, the dipped cords are especially favorable for reinforcing materials for brake hoses. For reinforcing materials for brake hoses, preferably, they are braided into desired structures.

EXAMPLES

Having generally described this invention, a further understanding can be obtained by reference to certain specific examples which are provided herein for purposes of illustration only and are not intended to be limiting unless otherwise specified.

The samples produced in the Examples were analyzed and tested according to the methods mentioned below.
Amount of Cyclic Polyalcohol Derivatives Applied to PVA (% by mass/PVA)

2 g of a sample of reinforcing fibers or dipped cords to which a cyclic polyalcohol derivative had been applied and 100 ml of distilled water were put into a 300-ml Erlenmeyer flask, and left therein at room temperature for 24 hours, whereby the cyclic polyalcohol derivative was extracted out of the sample. The liquid was analyzed through high performance liquid chromatography using a UV detector, whereby the amount of the cyclic polyalcohol derivative in the sample was determined. In the following Examples, the cyclic polyalcohol derivative used is sodium catechol. In HPLC for the determination, the column was a reversed-phase ODS column, and the mobile phase with water/methanol=1/1.

tanδ

Using Rheology's FT Rheospectrer DVE-V4, a sample of PVA based fibers or dipped cords was heated from −50° C. up to 250° C. at a heating rate of 3° C./min. The frequency was 10 Hz, and the amplitude was 5 μm. The data of tanδ of the sample at varying temperatures were read.

Composition of RFL

| Liquid A: | |
|---|---|
| Water | 300 parts |
| Resorcinol | 11 parts |
| Formaldehyde (37 % by mass) | 24 parts |
| Aqueous solution of sodium hydroxide. | (10 % by mass) 11 parts |
| The liquid A was aged at 25° C. for 6 hours. | |
| Liquid B: | |
| SBR latex | 130 parts |
| Vinylpyridine-modif~ed SBR latex | 130 parts |
| Water | 260 parts |

The liquid B was mixed with the aged liquid A, and then further aged at 25° C. for 16 hours to prepare RFL.

Tensile tenacity, cN/dtex; Elongation at break, %; Intermediate Elongation, %

PVA based fibers or dipped cords were dried at 105° C. for at least 2 hours to prepare a sample having a water content of at most 1% by mass/PVA. According to JIS L1013, "Testing methods for man-made filament yarns", the tensile tenacity and the elongation at break of the sample were measured. A load-elongation curve of the sample was drawn, in which the intermediate elongation of the sample under a load of 1.8 cN/dtex was read.

In actual production of hoses, the material is heated at a temperature of at least 150° C. in the step of rubber vulcanization, and therefore the water content of the reinforcing PVA based fibers shall be at most 1% by mass/PVA. Accordingly, for checking the profile of the fibers for reinforcing materials for brake hoses, it is important that the water content of the fibers should be at most 1% by mass/PVA. Where the sample (non-processed fibers, or fibers processed with a rubber adhesiveness improver) has absorbed water in air and its water content is greater than 1% by mass/PVA, its elongation measured will be larger than that of the sample not having absorbed water.

Fatigue Resistance, %

The fatigue resistance of PVA based fibers was evaluated as follows:

The fibers were twisted at 90 t/m into twisted yarns, which were then processed with RFL to have an RFL content of 3% by mass. The processed yarns were subjected to a disc fatigue test (Goodrich method) according to JIS L1017. Both the stretch rate and the compression rate of rubber specimen which yarn was set inside were 1%; yarn compression was 1%; the disc rotation speed was 2500 rpm; the temperature was 90° C.; and the disc was rotated 100,000 times. The tensile strength of the fibers before the test is represented by A; and that after the test is by B. The fatigue resistance of the sample is indicated by (B/A)×100.

The fatigue resistance of dipped cords was evaluated as follows: PVA based fibers were double-twisted at a count of primary twist of 300 t/m and at a count of final twist of 300 t/m into double-twisted cords, which were then processed with RFL to have an RFL content of 8% by mass. The processed cords were subjected to a disc fatigue test according to JIS L1017. Both the stretch rate and the compression rate of rubber specimen which cord was set inside were 2%; the disc rotation speed was 2500 rpm; the temperature was 90° C. and the disc was rotated 300,000 times. The tensile strength of the cords before the test is represented by A; and that after the test is by B. The fatigue resistance of the sample is indicated by (B/A)×100.

In the following Examples 1–2 and Comparative Examples 1–3, the results are shown in Table 1.

TABLE 1

| | The properties of fibers | | | | | The properties of dipped cords | | | | |
|---|---|---|---|---|---|---|---|---|---|---|
| | tanδ at 90° C. | Tensile tenacity cN/dtex | Elongation at break % | Intermediate Elongation % | Fatigue Resistance % | tanδ at 90° C. | Tensile tenacity cN/dtex | Elongation at break % | Intermediate Elongation % | Fatigue Resistance % |
| Example 1 | 0.139 | 6.7 | 17.2 | 4.3 | 90 | 0.175 | 7.0 | 13.9 | 1.6 | 91 |
| Example 2 | — | — | — | — | — | 0.152 | 6.8 | 13.7 | 1.7 | 90 |
| Comparative Example 1 | 0.057 | 6.3 | 17.4 | 4.4 | 61 | 0.087 | 7.1 | 14.0 | 1.8 | 58 |
| Comparative Example 2 | 0.113 | 8.1 | 8.1 | 2.0 | 42 | 0.114 | 8.0 | 7.8 | 1.3 | 36 |
| Comparative Example 3 | 0.065 | 9.5 | 8.0 | 1.7 | 20 | 0.077 | 9.7 | 7.6 | 1.2 | 19 |

Example 1

An aqueous solution of PVA having a degree of polymerization of 1750 and a saponification degree of 99.9 mol % (the solution has a PVA concentration of 45% by mass) was spun out through a spinneret having 200 holes (each hole has a pore diameter of 0.8 mm) into air and dried. The fibers were drawn under dry heat at 243° C., and at a total draw ratio of 12 times the original length of the fibers, and then shrunk at the same temperature to a degree of shrinkage of 16% to prepare PVA multi-filaments (1333 dtex/200 f). These are raw filaments. The value of tanδ at 90° C. of the raw PVA multi-filaments was 0.057; the tensile tenacity thereof was 6.3 cN/dtex; the elongation at break thereof was 17.4%; the intermediate elongation thereof was 4.4%; and the fatigue resistance thereof was 61% (See the curve B1 in FIG. 1).

Figure 2:
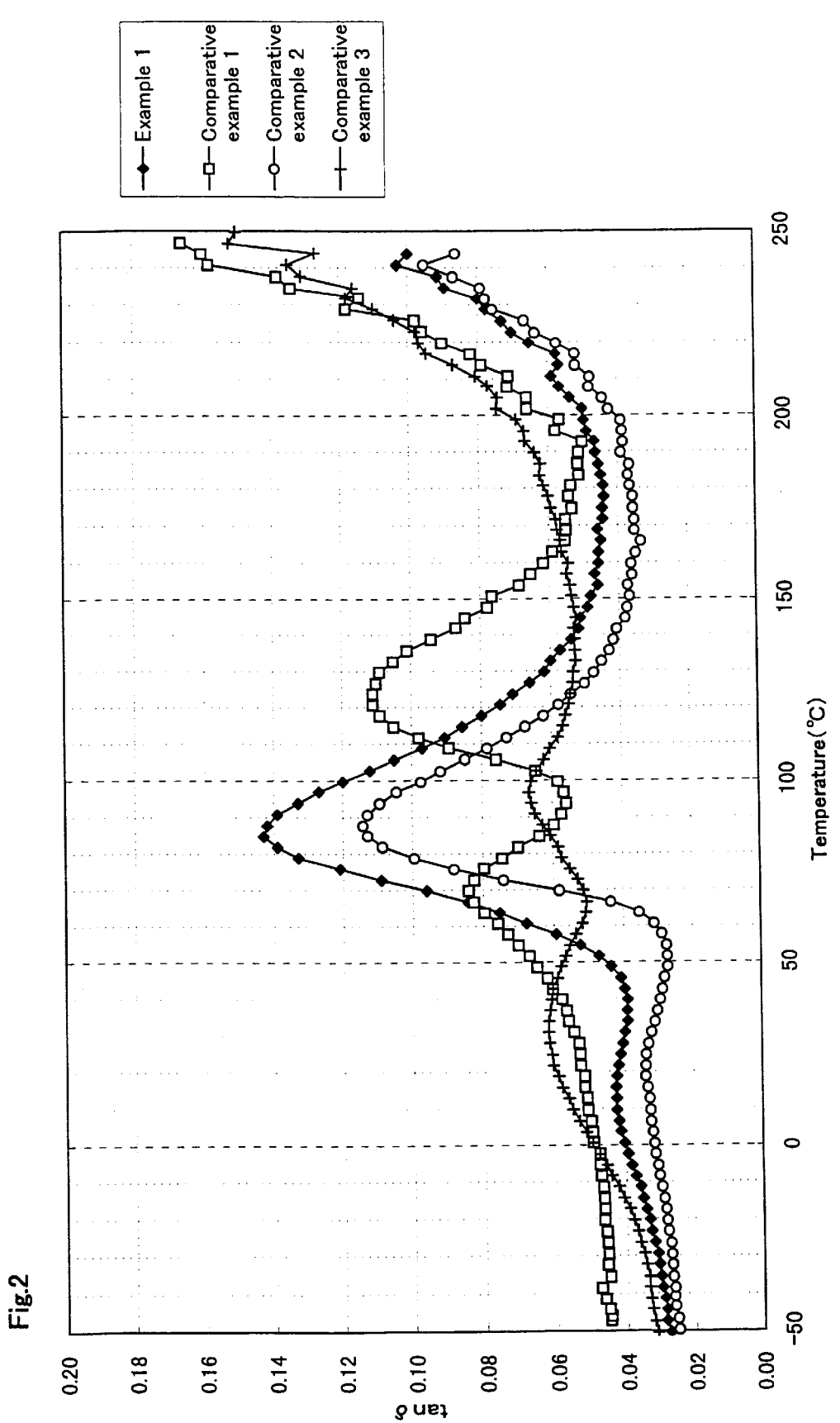
FIG. 2 is a graph indicating the relationship between the value of tan$\delta$ and the temperature of the PVA based fibers prepared in the Examples and Comparative Examples.

The raw filaments were passed through an aqueous solution of a cyclic polyalcohol derivative under a tension of 0.09 cN/dtex and at a running speed of 40 m/min, then squeezed until their liquid content became 40% by mass/PVA, and thereafter passed through a hot air drying zone at 90° C. to dry them. The thus-processed filaments had an increased elongation at break, and an increased value of tanδ at 90° C., and had one peak of tanδ within a temperature range falling between 60 and 120° C. Their fatigue resistance was good. The data are given in Table 1 and FIG. 2. The cyclic polyalcohol derivative used herein was sodium catechol prepared from 10 parts by mass of catechol and 2 parts by mass of sodium hydroxide.

Next, the fiber bundles were dipped in RFL, and thermally treated to prepare dipped cords. For the thermal treatment, the tension applied was 0.15 cN/dtex (measured with a tensiometer with a full scale of 4.9 N); the running speed was 40 m/min; the drying temperature was 120° C.; and the curing temperature was 185° C. The dry dipped cords had an RFL content of 3% by mass/PVA, and a cyclic polyalcohol derivative content of 2% by mass/PVA. The dipped cords had an increased elongation at break, and an increased value of tanδ at 90° C., and had one pak of tanδ within a temperature range falling between 60 and 120° C. Their fatigue resistance was good. In addition, the elongation of the dipped cords under a load of 1.8 cN/dtex was small and the strength thereof was large. Accordingly, the dipped cords have good dimensional stability and expanding resistance, and are therefore favorable for rubber reinforcing materials, especially to those for brake hoses. The data are given in Table 1 and FIG. 3.

Example 2

Dipped cords were prepared in the same manner as in Example 1. In this example, however, the aqueous catechol derivative solution was added to RFL, and the treatment with the cyclic polyalcohol derivative and the treatment with the rubber adhesiveness improver were effected at the same time. In this process, the cyclic polyalcohol derivative, sodium catechol was effectively applied to the filaments. The ratio of sodium catechol/RFL was 4.5/2.5 (by mass), and the PVA based filaments prepared herein had an RFL content of 3% by mass/PVA and a cyclic polyalcohol derivative content of 2% by mass/PVA. The dipped cords obtained herein had an increased elongation at break, and an increased value of tanδ at 90° C., and their fatigue resistance was good. In addition, the elongation of the dipped cords under a load of 1.8 cN/dtex was small and the strength thereof was large. Accordingly, the dipped cords have good dimensional stability and expanding resistance, and are therefore favorable for reinforcing materials for brake hoses. The data are given in Table 1 and FIG. 3.

Comparative Example 1

The same process as in Example 1 was repeated. In this comparative example, however, the cyclic polyalcohol derivative was not applied to the filaments. The filaments and the dipped cords obtained herein both had a small value of tanδ at 90° C. and had two peaks within a temperature range falling between 0 and 200° C. The fatigue resistance of the filaments and the dipped cords obtained herein was poorer than that in Example 1. The data are given in Table 1, and in FIGS. 2 and 3.

Comparative Example 2

The same process as in Example 1 was repeated. In this comparative example, however, Kuraray's dry-spun PVA filaments (Kuralon type-1239; 1332 dtex/200 f) were used as raw filaments. The value of tanδ at 90° C. of the raw filaments was 0.040; the tensile tenacity thereof was 8.3 cN/dtex; the elongation at break thereof was 8.0%; the intermediate elongation thereof was 1.9%; and the fatigue resistance thereof was 26% (See the curve B2 in FIG. 1).

The value of tanδ at 90° C. and the elongation at break of the filaments with the cyclic polyalcohol derivative and those of the dipped cords obtained herein were all small and low, and their fatigue resistance was poor. The data are given in Table 1, and in FIGS. 2 and 3.

Comparative Example 3

The same process as in Example 1 was repeated. In this comparative example, however, Kuraray's wet-spun PVA filaments (Kuralon type-5506; 1332 dtex/600 f) were used as raw filaments. The value of tanδ at 90° C. of the raw filaments was 0.028; the tensile tenacity thereof was 9.5 cN/dtex; the elongation at break thereof was 8.0%; the intermediate elongation thereof was 1.7%; and the fatigue resistance thereof was 20% (See the curve C of FIG. 1).

The value of tanδ at 90° C. and the elongation at break of the filaments with the cyclic polyalcohol derivative and those of the dipped cords obtained herein were all small and low, and their fatigue resistance was poor. The data are given in Table 1, and in FIGS. 2 and 3.

While the invention has been described in detail and with reference to specific embodiments thereof, it will be apparent to one skilled in the art that various changes and modifications can be made therein without departing from the spirit and scope thereof.

The disclosure of Japan priority application 202746/1999, filed Jul. 16, 1999, is hereby incorporated by reference.

What is claimed is:

1. Polyvinyl alcohol based fiber having
   (1) tanδ at 90° C. of at least 0.12,
   (2) substantially one peak of tanδ within a temperature range of from 60 to 120° C., and
   (3) elongation at break of at least 12%.

2. Polyvinyl alcohol based fiber as claimed in claim 1, which contain a cyclic polyalcohol or a derivative thereof.

3. Polyvinyl alcohol based fiber as claimed in claim 2, wherein the cyclic polyalcohol or derivative thereof is at least 50% by mass of catechol or derivative thereof.

4. Polyvinyl alcohol based fiber as claimed in claim 2, wherein the cyclic polyalcohol or derivative thereof is catechol or derivative thereof.

5. Polyvinyl alcohol based fiber as claimed in claim 1, wherein the polyvinyl alcohol has a saponification degree of at least 70 mol %.

6. Polyvinyl alcohol based fiber as claimed in claim 1, wherein the polyvinyl alcohol has a mean degree of polymerization of between about 1000 and 5000.

7. Polyvinyl alcohol based fiber as claimed in claim 1, wherein the polyvinyl alcohol based fiber contains at least 50% by mass of polyvinyl alcohol.

8. Dipped cord comprising polyvinyl alcohol based fiber bundles processed with a rubber adhesiveness improver, wherein said dipped cord has
   (1) tanδ at 90° C. of at least 0.12,
   (2) substantially one peak of tanδ within a temperature range of from 60 to 120° C., and
   (3) elongation at break of at least 10%.

9. Dipped cord as claimed in claim 8, which contains a cyclic polyalcohol or a derivative thereof.

10. Dipped cord as claimed in claim 9, wherein the cyclic polyalcohol or a derivative thereof is at least 50% by mass of catechol or derivative thereof.

11. Dipped cord as claimed in claim 9, wherein the cyclic polyalcohol or a derivative thereof is catechol or a derivative thereof.

12. Dipped cord as claimed in claim 8, wherein the rubber adhesiveness improver is a resorcinol formalin latex.

13. A method for producing dipped cords having tanδ at 90° C. of at least 0.12, having substantially one peak of tanδ within a temperature range of from 60 to 120° C., and having a degree of elongation at break of at least 10%, which comprises applying a rubber adhesiveness improver to polyvinyl alcohol based fibers having a degree of elongation at break of at least 12%, then drying the fibers, and thereafter thermally treating the dried fibers at a temperature falling between 110 and 200° C. and under a tension of at least 0.1 cN/dtex.

14. The method for producing dipped cords as claimed in claim 13, which further comprises applying a cyclic polyalcohol or a derivative thereof to the polyvinyl alcohol based fibers during or before the step of applying the rubber adhesiveness improver to the fibers.

15. The method for producing dipped cords as claimed in claim 14, wherein the cyclic polyalcohol or a derivative thereof is at least 50% by mass of catechol or derivative thereof.

16. The method for producing dipped cords as claimed in claim 14, wherein the cyclic polyalcohol or a derivative thereof is catechol or derivative thereof.

17. A rubber-reinforcing material comprising the dipped cord of claim 13.

18. A rubber-reinforcing material comprising the dipped cord of claim 14.

19. A rubber-reinforcing material comprising the dipped cord of claim 15.

20. A rubber-reinforcing material comprising the dipped cord of claim 16.

\* \* \* \* \*